Aug. 2, 1966 P. A. SELLNER 3,263,650
FARROWING APPARATUS
Filed Feb. 9, 1965

INVENTOR
PHILIP A. SELLNER
BY Fisher, Christen, Sabol & Caldwell
ATTORNEYS

3,263,650
FARROWING APPARATUS
Philip A. Sellner, Sleepy Eye, Minn.
Filed Feb. 9, 1965, Ser. No. 431,412
3 Claims. (Cl. 119—20)

This invention relates to animal husbandry, and more particularly to a device for farrowing pigs which is designed to reduce the likelihood of destruction of pigs during the first weeks before being weaned.

During this period, usually from birth of the pigs to about the age of six weeks, the sow is careless of her young and may cause their death by inadvertently lying upon them and smothering them. She is also unconcerned about whether she eats feed intended for the pigs, so long as she has access to it, thus may retard their growth by eating feed not intended for her use.

In the present invention means is provided whereby a protected area in a farrowing pen is provided for the pigs, to which the sow cannot gain access.

This means may comprise a barrier, such as a guard wheel, mounted for rotation about a vertical axis in a farrowing pen, under which the feed for the pigs may be distributed. The guard wheel is arranged at a height such that the pigs may be sheltered under it, the sow being prevented from encroaching on the feeding area reserved for the pigs.

It is a further object of the invention to provide a farrowing pen having a removable guard mechanism for sheltering the pigs from the movements of the sow during the period of weaning.

Other objects and advantages will be apparent to those skilled in the art after reading the following specification in connection with the annexed drawings, in which.

Figure 1:
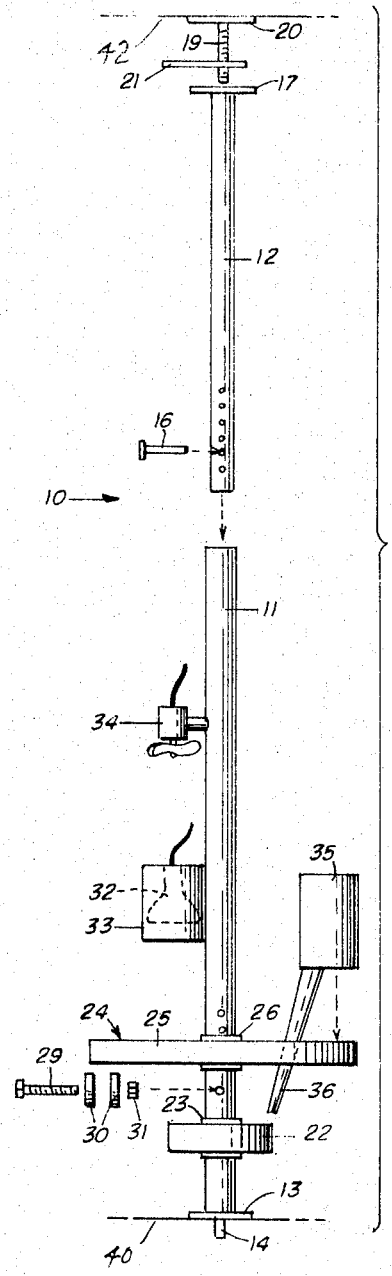
FIG. 1 is a side elevation of a preferred form of farrowing device constructed in accordance with the teachings of this invention, with the upper and lower sections of the supporting column being separated from each other and the automatic feeding mechanism removed from its support.
Figure 2:
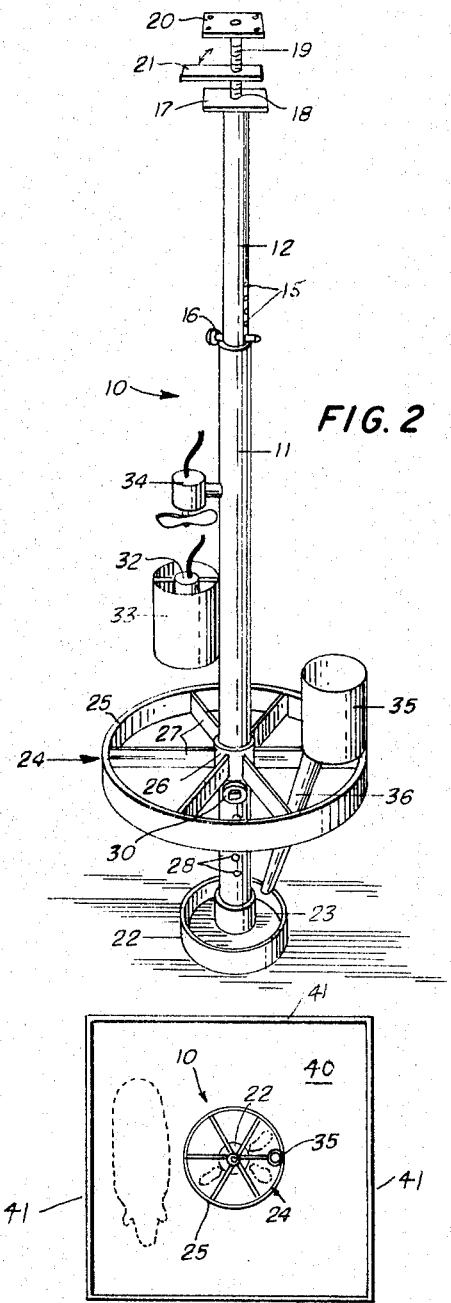
FIG. 2 is a perspective view of the device shown in FIG. 1 with all the elements assembled; and, FIG. 3 is a plan view of a farrowing pen on a greatly reduced scale, showing the farrowing device positioned in the center of the pen.
Figure 3:
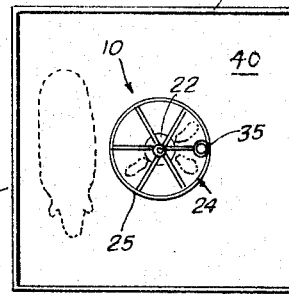

Turning now to a detailed description of the invention, it can be seen that various elements of the device can be supported by a vertically positioned column, indicated by numeral 10 which preferably comprises a pair of tubular elements 11 and 12, one of which is telescopically received within the other to provide an adjustable height. Attached to the lower end of the element 11 is a flat floor plate 13 and projecting below the plate is a positioning pin 14. The other tubular element 12 is provided with a plurality of vertically spaced diametrically arranged openings 15 which can receive an adjusting pin 16 to provide a rough adjustment of the height of the supporting column 10. A flat plate 17 may be attached to the upper end of the element 12, this plate having a threaded central opening 18 to operatively receive the threaded bolt 19. The upper end of the bolt 19 is preferably attached to another flat plate 20 for rotation about its axis and is provided with a laterally extending tightening bar or handle 21.

A circular feed pan 22 is provided with a central opening having a cylindrical collar 23 attached to the bottom of the pan, the diameter of the collar being such that it can be slidably received on the lower tube 11. The supporting column 10 also supports a rotatable guide wheel, indicated generally by numeral 24, which comprises an outer cylindrical rim 25 attached to a collar 26, which is slidable and rotatable on the lower tube 11, by means of a plurality of radial spokes 27. A series of vertically spaced openings 28 are arranged in pairs in opposite sides of the tube 11 to receive a bolt 29 which, in turn, supports a pair of rollers 30, one on each side of the tube, the bolt being held in place in a selected one of a number of vertical positions by means of a nut 31. The rollers in turn bear against the bottom edge of the collar 26 and thus enable the guide wheel to rotate freely.

A conventional electric heat lamp 32, mounted in a protective shield 33 can be detachably secured to the tube 11 at a slight distance above the uppermost position of the guide wheel to direct heat downwardly upon the feed pan. In addition, if desired, an electric fan 34 can also be detachably secured to the tube 11 above the heat lamp so as to assist in the circulation of warm air on the floor of the pen.

As an added convenience, an automatic feeding device such as a container 35 having a downwardly directed spout 36 can be detachably secured to the outer rim 24 of the guide wheel, the length of the spout being such that it will project downwardly into the feed pan. Rotation of the guide wheel, caused by movement of a sow against it, or depletion of the feed in the pan will cause a flow of feed from the container 35.

In use it is preferred to keep the sow in a farrowing pen having a floor, indicated by numeral 40, approximately 6 feet on a side enclosed by four walls 41 which may extend to the ceiling 42, but usually extend upwardly only a distance sufficient to confine the sow or, approximately three feet.

The device is installed in sections by first placing the pin 14 into an opening provided in the center of the floor. The feed pan 22, approximately 10 inches in diameter is then slipped on the lower tube 11 and allowed to rest on the floor. Next, the bolt 29, is inserted through the opening 28 and fastened with the rollers 30 on opposite sides of the support tube to position the guide wheel 24 at the proper distance from the floor, usually between 10 and 14 inches. The wheel itself may be approximately 24 inches in diameter. The collar is then slipped on the tube and allowed to drop down and rest on the rollers.

The lower end of the upper tube support 12 is then inserted into the upper end of the lower tube and the pin 16 inserted into the opening 15 which will bring the top of tube 12 and plate 17 into engagement with the lower end of bolt 19, which is attached to the center of the ceiling by plate 20. If the pan is an open one, the plate 20 can be secured to an overhead support, such as a ceiling rafter, or joist. Finally, the whole assembly is secured by rotating the bolt 19 by means of the handle 21.

Depending on weather conditions, the heat source 32, and the blower 34 can be attached, or detached to the supporting column, as desired. Also, while it may be preferable to supply feed to the pan 22 manually, as desired, the automatic dispensing device 35 can be attached to, or removed from, the rim of the guide wheel 24, as desired.

The fan would ordinarily be used only in the summer for cooling and drying. The principal purpose of the fan and the heat lamp are to furnish a dry, non-slippery area for the small pigs. They incidentally furnish some heat in the winter and the fan furnishes some cooling in the summer.

It will thus be seen that, when the device is assembled in the farrowing pen, the sow will have a space of approximately two feet between the rim of the wheel 24 and the adjacent wall to move about in the pen, while the pigs will have a circular area of nearly two feet in diameter in the center of the pen in which to feed and be safeguarded against careless action by the sow. In addition, this central area can be kept warm, if necessary by means of the heat source and blower.

I claim:

1. A farrowing pen for sows, comprising a horizontal floor, a vertical support extending upwardly from the floor, a feed pan on the floor adjacent the support, a horizontally disposed circular guide wheel concentrically and rotatably attached to the support spaced above the floor and having a radius to extend outwardly substantially beyond the feed pan to prevent a sow from approaching the floor space adjacent the support, feed dispensing means mounted on the guide wheel including a spout extending downwardly into the feed pan, and an enclosure extending upwardly from the floor surrounding the guide wheel and spaced outwardly therefrom a distance sufficient only to permit passage therebetween of a single sow.

2. The invention as defined in claim 1, wherein said pen includes a ceiling and said enclosure comprises four walls extending from floor to ceiling.

3. The invention as defined in claim 2, wherein said support comprises a column extending between the floor and ceiling.

References Cited by the Examiner

UNITED STATES PATENTS

| | | | |
|---|---|---|---|
| 1,309,071 | 7/1919 | Johnson | 119—16 |
| 1,531,842 | 3/1925 | Carpenter | 119—63 |
| 2,281,776 | 5/1942 | Lyon | 119—33 |
| 2,711,715 | 6/1955 | Thale | 119—20 |
| 2,933,062 | 4/1960 | Geerlings | 119—52 |
| 3,191,578 | 6/1965 | Magruder | 119—20 |

FOREIGN PATENTS 1,158,741  12/1963  Germany.

SAMUEL KOREN, *Primary Examiner.*

HUGH R. CHAMBLEE, *Examiner.*